United States Patent
Haraguchi et al.

(10) Patent No.: US 9,957,845 B2
(45) Date of Patent: May 1, 2018

(54) EXHAUST HEAT RECOVERY DEVICE

(71) Applicant: SANDEN HOLDINGS CORPORATION, Isesaki-shi (JP)

(72) Inventors: Tomonori Haraguchi, Isesaki (JP); Hiroyuki Nagai, Yokohama (JP)

(73) Assignee: SANDEN HOLDINGS CORPORATION, Gunma (JP)

(*) Notice: Subject to any disclaimer, the term of this patent is extended or adjusted under 35 U.S.C. 154(b) by 312 days.

(21) Appl. No.: 14/780,614

(22) PCT Filed: Mar. 26, 2014

(86) PCT No.: PCT/JP2014/058449
§ 371 (c)(1),
(2) Date: Nov. 24, 2015

(87) PCT Pub. No.: WO2014/157300
PCT Pub. Date: Oct. 2, 2014

(65) Prior Publication Data
US 2016/0076403 A1    Mar. 17, 2016

(30) Foreign Application Priority Data
Mar. 28, 2013 (JP) ................. 2013-069540

(51) Int. Cl.
F01K 23/06    (2006.01)
F01K 13/02    (2006.01)
(Continued)

(52) U.S. Cl.
CPC ............ F01K 23/065 (2013.01); F01K 13/02 (2013.01); F01K 23/10 (2013.01); F01K 23/101 (2013.01);
(Continued)

(58) Field of Classification Search
CPC . F02G 5/00; F02G 5/02; Y02T 10/166; F01K 23/065; F01K 25/08; F01K 13/02;
(Continued)

(56) References Cited

U.S. PATENT DOCUMENTS 4,590,384 A * 5/1986 Bronicki ............... F01K 23/14
                                                    290/4 C
6,450,283 B1   9/2002 Taggett
(Continued)

FOREIGN PATENT DOCUMENTS

DE    112012004058     7/2014
JP    2009-97387       5/2009
(Continued)

OTHER PUBLICATIONS

Office Action dated Jan. 20, 2017 which issued in the corresponding German Patent Application No. 112014001713.2.

Primary Examiner — Mark Laurenzi
Assistant Examiner — Wesley Harris
(74) Attorney, Agent, or Firm — Cozen O'Connor

(57) ABSTRACT

To effectively reduce a situation in which an over-rotation of an expander occurs or the expander becomes a load on an engine at the time of a stop of a Rankine cycle in an exhaust heat recovery device provided with the Rankine cycle that recovers exhaust heat of an engine. A pressure difference ΔP between a high-pressure side and a low-pressure side of the Rankine cycle is obtained when the Rankine cycle is stopped (S1), a waiting time Ta is set (calculated) based on the obtained pressure difference ΔP (S2). Then, a bypass valve is opened to allow a refrigerant to circulate while bypassing the expander (S3), and then an electromagnetic clutch is disengaged when the waiting time Ta has elapsed to block transmission of power between the expander and the engine (S4, S5).

9 Claims, 8 Drawing Sheets

(51) Int. Cl.
*F01K 23/10* (2006.01)
*F01K 25/10* (2006.01)
*F02G 5/02* (2006.01)
*F01K 23/14* (2006.01)
*F02G 5/00* (2006.01)

(52) U.S. Cl.
CPC .............. *F01K 23/14* (2013.01); *F01K 25/10* (2013.01); *F02G 5/00* (2013.01); *F02G 5/02* (2013.01); *Y02T 10/166* (2013.01)

(58) Field of Classification Search
CPC .......... F01K 23/10; F01K 23/14; F01K 25/10; F01K 23/101
See application file for complete search history.

(56) References Cited

U.S. PATENT DOCUMENTS

| | | |
|---|---|---|
| 2009/0211253 A1 | 8/2009 | Radcliff et al. |
| 2015/0047351 A1 | 2/2015 | Ishikawa et al. |

FOREIGN PATENT DOCUMENTS

| | | | |
|---|---|---|---|
| JP | 2010-101283 | 5/2010 | |
| JP | 2011-149373 | 8/2011 | |
| JP | 2012-41933 | 3/2012 | |
| JP | 2012-193690 | 10/2012 | |
| JP | 2013-76374 | 4/2013 | |
| WO | WO 2012124768 A1 * | 9/2012 | ............. F01K 23/14 |

\* cited by examiner

EXHAUST HEAT RECOVERY DEVICE

RELATED APPLICATIONS

This is a U.S. National Phase Application under 35 USC 371 of International Application PCT/JP2014/058449 filed on Mar. 26, 2014.

This application claims the priority of Japanese application no. 2013-069540 filed Mar. 28, 2013, the entire content of which is hereby incorporated by reference.

TECHNICAL FIELD

The present invention relates to an exhaust heat recovery device provided with a Rankine cycle that recovers exhaust heat of an external heat source such as an engine.

BACKGROUND ART

As this type of device, for example, a waste-heat reusing device disclosed in Patent Document 1 has been known. The waste-heat reusing device disclosed in Patent Document 1 includes: a Rankine cycle equipped with a pump, a heater, an expander, and a condenser; a bypass flow passage which bypasses the expander; and a bypass valve that opens and closes the bypass flow passage. In addition, the pump, the expander, and a motor generator are connected to each other by a common drive shaft. Then, at the time of stopping the Rankine cycle, the waste-heat reusing device is configured to open the bypass valve and stop the motor generator by confirming that the differential pressure of the expander becomes sufficiently smaller, to thereby stop the pump and the expander.

In the waste-heat reusing device disclosed in Patent Document 1, the pump is driven by output of the expander and the motor generator is driven by excess output.

REFERENCE DOCUMENT LIST

Patent Document

Patent Document 1: Japanese Patent Application Laid-open Publication No. 2009-97387

SUMMARY OF THE INVENTION

Problems to be Solved by the Invention

When an engine is configured to be assisted by the output of an expander, a power transmission mechanism having a clutch mechanism is generally provided between the expander and the engine. In such a configuration, at the time of stopping a Rankine cycle, it is thought to open the bypass valve and disengage the clutch mechanism by confirming that the differential pressure of the expander becomes sufficiently smaller, to thereby stop the expander.

However, since the change in an actual differential pressure of the expander does not necessarily coincide with the change in the output of the expander, it may not be possible to disengage the clutch mechanism at appropriate timing only by confirming that the differential pressure of the expander becomes sufficiently smaller as in the conventional technique. For example, the clutch mechanism may be disengaged to cause the over-rotation of the expander before the output of the expander sufficiently decreases; or despite the fact that the output of the expander sufficiently decreases, the clutch mechanism may not be disengaged, and, on the contrary, the expander may become the load on the engine (that is, the output of the expander is negative).

Therefore, an object of the present invention is to disengage the clutch mechanism at appropriate timing at the time of stopping the Rankine cycle in the exhaust heat recovery device provided with the Rankine cycle, to thereby effectively reduce the occurrence of the over-rotation of the expander or the negative output of the expander.

Means for Solving the Problems

An exhaust heat recovery device according to an aspect of the present invention includes: a Rankine cycle that is provided with a heater configured to heat and vaporize refrigerant by exhaust heat of an engine, an expander configured to expand the refrigerant passed through the heater to generate power, a condenser configured to condense the refrigerant passed through the expander, and a pump configured to send the refrigerant passed through the condenser to the heater, the heater, the expander, the condenser, and the pump being arranged in a refrigerant circulating passage; a bypass flow passage that allows the refrigerant to circulate while bypassing the expander; a bypass valve that opens and closes the bypass flow passage; a power transmission mechanism that has a clutch mechanism and is capable of transmitting power between the expander and the engine when the clutch mechanism is engaged; and a control unit that, at the time of stopping the Rankine cycle, executes control to open the bypass valve and then to disengage the clutch mechanism when a waiting time has elapsed, the waiting time being set depending on operation states or operation conditions of the Rankine cycle before the bypass valve is opened or at the point of time when the bypass valve is opened.

Effects of the Invention

According to the exhaust heat recovery device, at the time of stopping the Rankine cycle, the bypass valve is opened and then the clutch mechanism is disengaged when the waiting time has elapsed, the waiting time being set depending on operation states or operation conditions of the Rankine cycle before the bypass valve is opened or at the point of time when the bypass valve is opened. This makes it possible to disengage the clutch mechanism in accordance with the timing at which the output of the expander sufficiently decreases after the bypass valve is opened and to effectively reduce a situation in which the over-rotation of the expander occurs or the output of the expander becomes negative at the time of the stop of the Rankine cycle.

MODE FOR CARRYING OUT THE INVENTION

With reference to the accompanying drawings, embodiments of the present invention will be described below.

Figure 1:
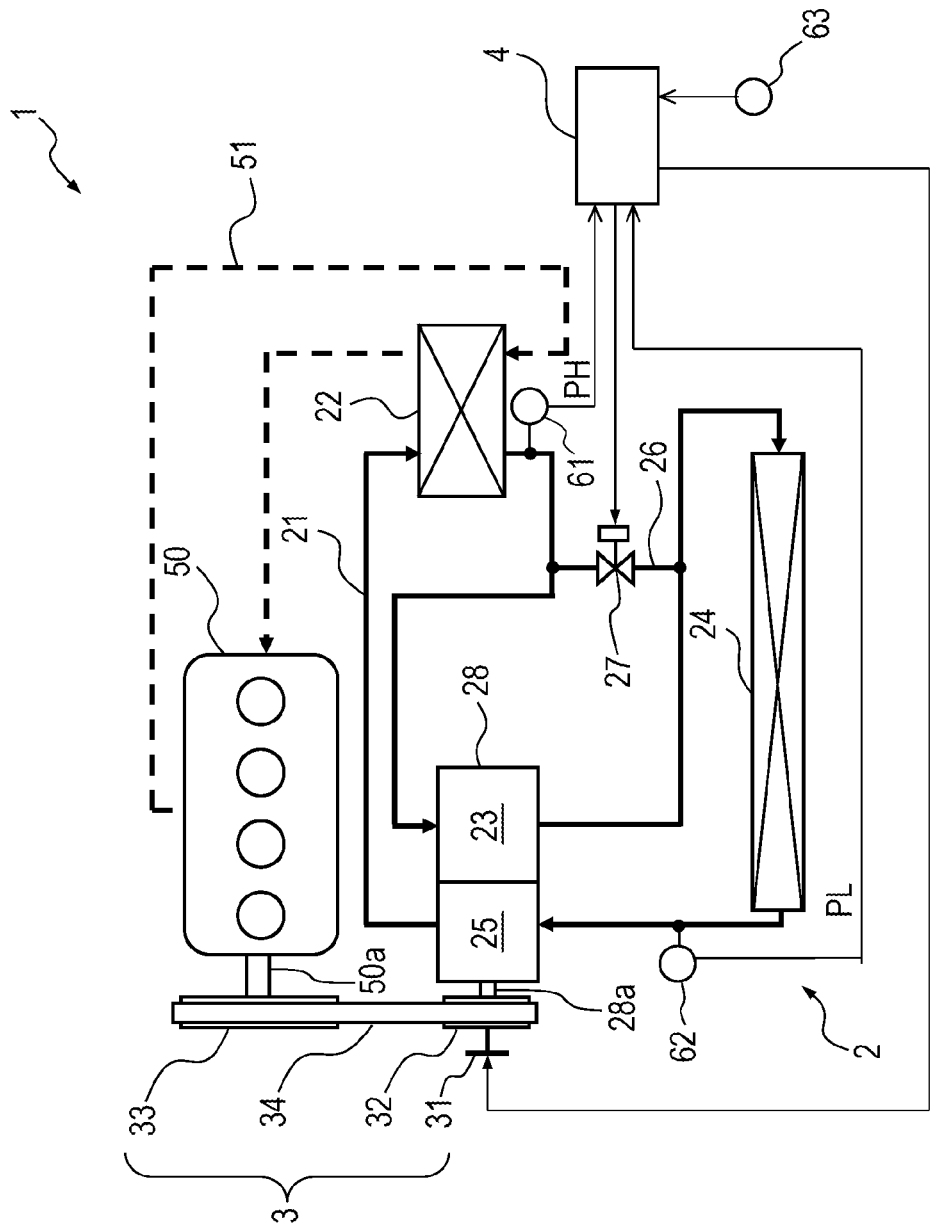
FIG. 1 is a diagram illustrating a schematic configuration of an exhaust heat recovery device according to a first embodiment of the present invention.

FIG. 1 illustrates a schematic configuration of an exhaust heat recovery device 1 according to a first embodiment of the present invention. The exhaust heat recovery device 1 is mounted on a vehicle to recover and use exhaust heat of an engine 50 of the vehicle. As illustrated in FIG. 1, the exhaust heat recovery device 1 includes: a Rankine cycle 2 that recovers the exhaust heat of the engine 50 and converts the exhaust heat into power; a power transmission mechanism 3 that performs power transmission between the Rankine cycle 2 and the engine 50; and a control unit 4 that controls the overall operation of the exhaust heat recovery device 1.

The engine 50 is a water-cooled internal combustion engine and is cooled by engine cooling water that circulates in a cooling water flow passage 51. A heater 22 of the Rankine cycle 2 to be described below is disposed on the cooling water flow passage 51, so that the engine cooling water that has absorbed heat from the engine 50 flows through the heater 22.

In a refrigerant circulating passage 21 of the Rankine cycle 2, the heater 22, an expander 23, a condenser 24, and a pump 25 are arranged in this order. Furthermore, a bypass flow passage 26, through which refrigerant flows to bypass the expander 23, is provided between the heater 22 and the condenser 24. The bypass flow passage 26 is opened and closed by a bypass valve 27 which is actuated and controlled by the control unit 4.

The heater 22 is a heat exchanger which heats the refrigerant to obtain superheated vapor, by performing heat exchange between the engine cooling water that has absorbed heat from the engine 50 and the refrigerant. Alternatively, the heater 22 may be configured to perform heat exchange between the refrigerant and the exhaust gas of the engine 50, instead of the engine cooling water.

The expander 23 is, for example, a scroll-type expander, and generates power by expanding the refrigerant, which is the superheated vapor heated by the heater 22, and by converting it into rotational energy.

The condenser 24 is a heat exchanger which performs heat exchange between the refrigerant passed through the expander 23 and the ambient air, thereby cooling and condensing (liquefying) the refrigerant.

The pump 25 is a mechanical pump that sends the refrigerant (liquid refrigerant) liquefied by the condenser 24 to the heater 22. Then, since the refrigerant, which has been liquefied by the condenser 24, is sent to the heater 22 by the pump 25, the refrigerant circulates through each of the elements of the Rankine cycle 2.

In this embodiment, the expander 23 and the pump 25 are integrally connected by a common rotating shaft 28a and configured as a "pump-integrated expander 28". That is, the rotating shaft 28a of the pump-integrated expander 28 has a function as an output shaft of the expander 23 and a function as a drive shaft of the pump 25.

The power transmission mechanism 3 has an electromagnetic clutch 31, a pulley 32 that is attached to the rotating shaft 28a of the pump-integrated expander 28 through the electromagnetic clutch 31, a crank pulley 33 that is attached to a crankshaft 50a of the engine 50, and a belt 34 that is wrapped around the pulley 32 and the crank pulley 33. The electromagnetic clutch 31 is controlled to be turned ON (engaged) and turned OFF (disengaged) by the control unit 4, so that the power transmission mechanism 3 transmits and shuts off power between the engine 50 and the Rankine cycle 2 (the pump-integrated expander 28).

Measurement signals of various sensors, such as a first pressure sensor 61 configured to measure a high-pressure side pressure PH of the Rankine cycle 2, a second pressure sensor 62 configured to measure a low-pressure side pressure PL of the Rankine cycle 2, and a rotation sensor 63 configured to measure the rotational number Nex of the expander 23, are input to the control unit 4. In addition, the control unit 4 is configured to be capable of transmitting information to and receiving information from a controller (not illustrated) of the vehicle. Then, the control unit 4 executes various types of control including start-up control and stop control of the Rankine cycle 2, based on the input measurement signals of various sensors or the information from the controller of the vehicle.

The high-pressure side pressure PH of the Rankine cycle 2 refers to a pressure in the refrigerant circulating passage 21 in a section extending from (the outlet of) the pump 25 to (the inlet of) the expander 23 through the heater 22, and the low-pressure side pressure PL of the Rankine cycle 2 refers to a pressure in the refrigerant circulating passage 21 in a section extending from (the outlet of) the expander 23 to (the inlet of) the pump 25 through the condenser 24. In this embodiment, the first pressure sensor 61 detects the pressure on the inlet side of the expander 23 (the outlet side of the heater 22) as the high-pressure side pressure PH of the Rankine cycle 2, and the second pressure sensor 62 detects the pressure on the inlet side of the pump 25 (the outlet side of the condenser 24) as the low-pressure side pressure PL of the Rankine cycle 2.

Next, the start-up control (Rankine start-up control) and the stop control (Rankine stop control) of the Rankine cycle 2 to be executed by the control unit 4 will be described.

Rankine Start-Up Control

The control unit 4 executes the Rankine start-up control, for example, when the start-up condition of the Rankine cycle 2 is satisfied. At the time of starting up the Rankine cycle 2, the control unit 4 engages the electromagnetic clutch 31 to actuate the pump 25 in a state of opening the bypass valve 27 at first and then closes the bypass valve 27 when a pressure difference $\Delta P$ between the high-pressure side pressure PH and the low-pressure side pressure PL of the Rankine cycle 2 is equal to or greater than a first predetermined value $\Delta Ps1$. Here, the first predetermined value $\Delta Ps1$ is a value that is set in advance as a pressure difference between the high-pressure side and the low-pressure side of the Rankine cycle 2 when a sufficient amount of liquid refrigerant (approximately 100%) is supplied to the inlet side of the pump 25.

Then, after the bypass valve 27 is closed, when the pressure difference $\Delta P$ between the high-pressure side pressure PH and the low-pressure side pressure PL of the Rankine cycle 2 is equal to or greater than a second predetermined value $\Delta Ps2$ (>first predetermined value $\Delta Ps1$), the control unit 4 determines that the start-up of the Rankine cycle 2 is completed and terminates the Rankine start-up control. The second predetermined value $\Delta Ps2$ is a value that is set in advance as a start-up completion determination value of the Rankine cycle 2.

In this way, the control unit 4 allows refrigerant to circulate while bypassing the expander 23 at the time of starting up the Rankine cycle 2 at first, and closes the bypass valve 27 to circulate the refrigerant through the expander 23 when the refrigerant on the net side of the pump 25 is sufficiently liquefied. Thus, the start-up performance (rapidity and reliability of start-up) of the Rankine cycle 2 can be improved and the Rankine cycle 2 can be efficiently operated with the operation time, in which output of the Rankine cycle 2 is negative, as a minimum required time.

Rankine Stop Control

Figure 2:
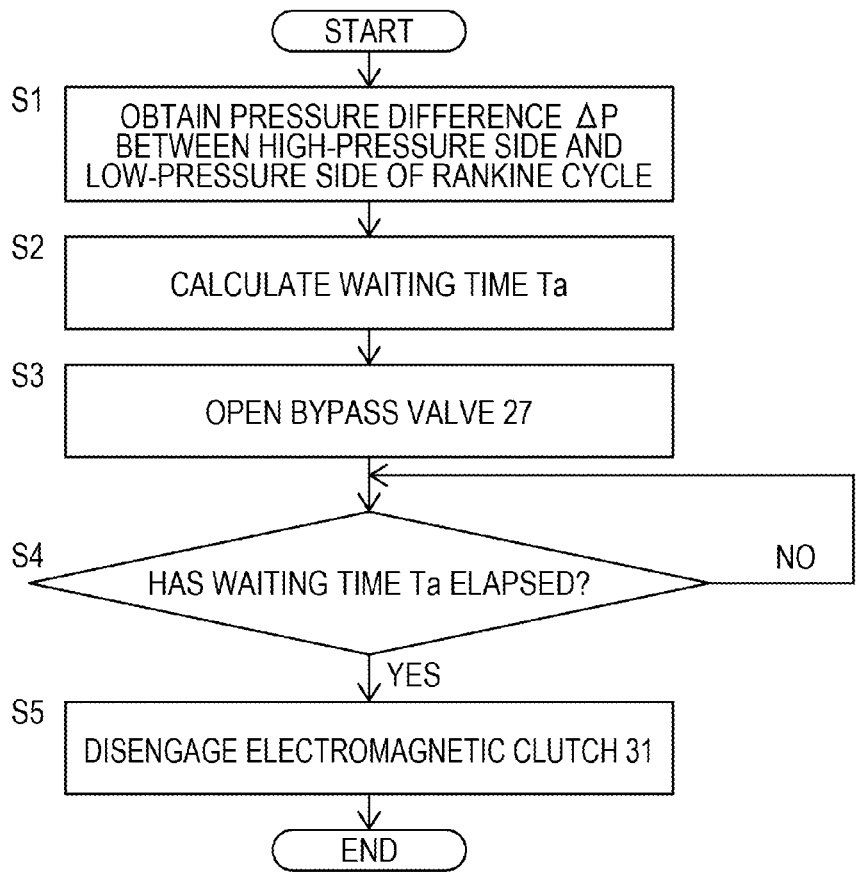
FIG. 2 is a flowchart of Rankine stop control according to the first embodiment.

The control unit 4 executes the Rankine stop control, for example, when determining that it is necessary to stop the Rankine cycle 2 or when receiving a stop request of the Rankine cycle 2 from the controller of the vehicle. FIG. 2 is a flowchart of the Rankine stop control.

At step S1, the pressure difference $\Delta P$ (=PH−PL) between the high-pressure side pressure PH and the low-pressure side pressure PL of the Rankine cycle 2 is obtained, based on the measurement signals of the first pressure sensor 61 and the second pressure sensor 62.

Figure 3:
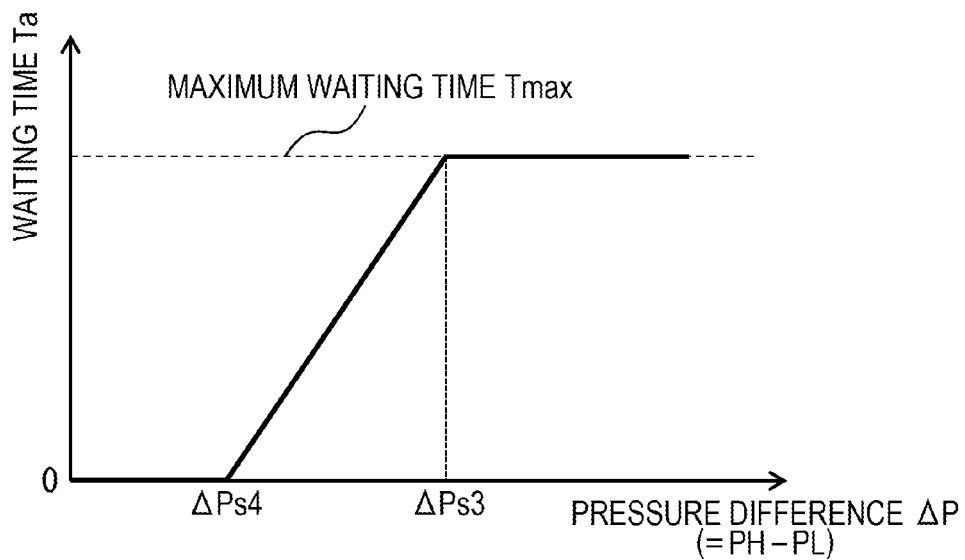
FIG. 3 is a diagram illustrating an example of a waiting time setting table.

At step S2, a waiting time Ta is set (calculated) based on the pressure difference $\Delta P$. For example, the control unit 4 may obtain the waiting time Ta with reference to a "waiting time setting table" as illustrated in FIG. 3, based on the pressure difference $\Delta P$. In addition, as is apparent from FIG. 3, the waiting time Ta can also be calculated by multiplying the pressure difference $\Delta P$ by a predetermined coefficient.

The waiting time Ta is the time (prediction time) required until the output of the expander 23 becomes sufficiently smaller (for example, the output of the expander 23 is approximately zero) after the bypass valve 27 is opened, and the waiting time Ta becomes also longer as the pressure difference $\Delta P$ becomes greater. However, as illustrated in FIG. 3, the maximum value (maximum waiting time Tmax) is set in the waiting time Ta, and the waiting time Ta becomes the maximum waiting time Tmax when the pressure difference $\Delta P$ is equal to or greater than a third predetermined value $\Delta Ps3$. Meanwhile, the waiting time Ta becomes 0 (s) when the pressure difference $\Delta P$ is equal to or less than a fourth predetermined value $\Delta Ps4$ (<$\Delta Ps3$). Moreover, any maximum waiting time Tmax can be set by, for example, a specification of the Rankine cycle 2, but the maximum waiting time Tmax is 0.5 (s) in this embodiment.

At step S3, the bypass valve 27 is opened. Thus, the refrigerant circulates while bypassing the expander 23 and the output of the expander 23 starts to decrease.

At step S4, it is determined whether the waiting time Ta has elapsed after the bypass valve 27 is opened, and when the waiting time Ta has elapsed, the process proceeds to step S5.

At step S5, the electromagnetic clutch 31 is disengaged to block the transmission of power between the engine 50 and the pump-integrated expander 28. Thus, the expander 23 and the pump 25 are stopped and the Rankine cycle 2 is stopped.

Figure 4:
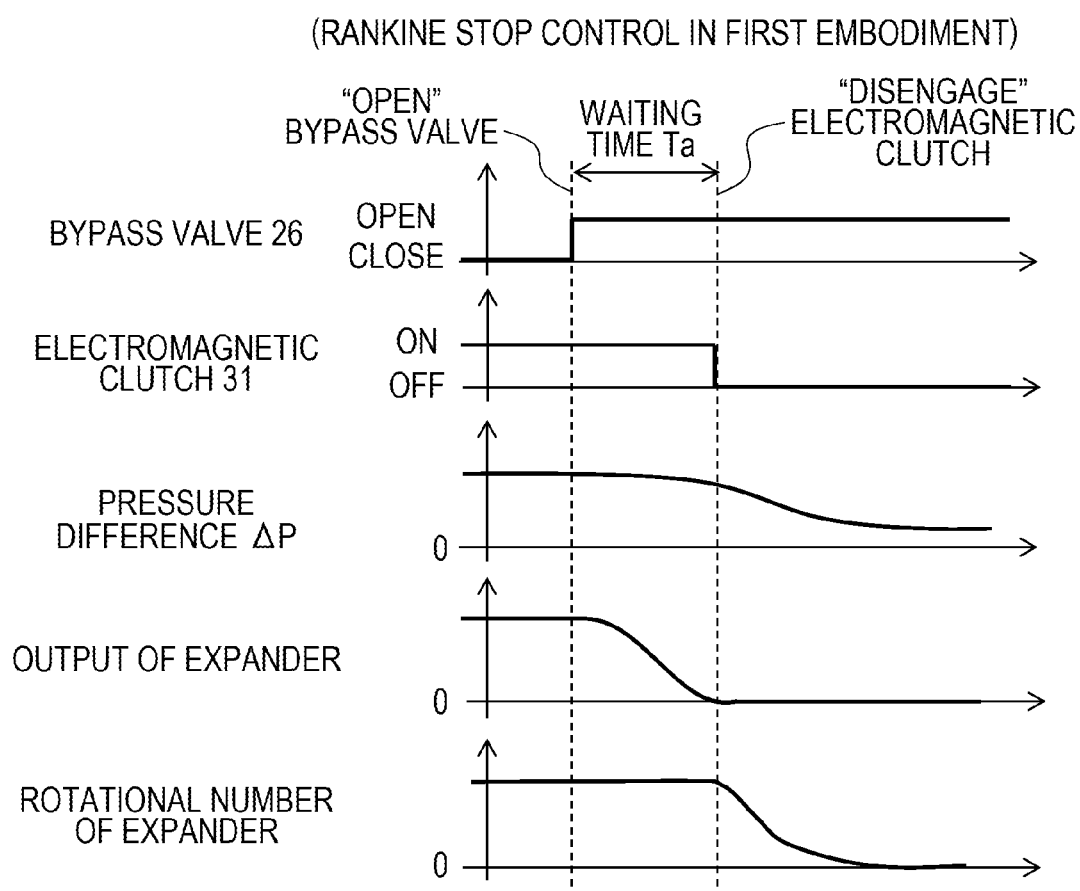
FIG. 4 is a diagram illustrating effects of the Rankine stop control according to the first embodiment.
Figure 5:
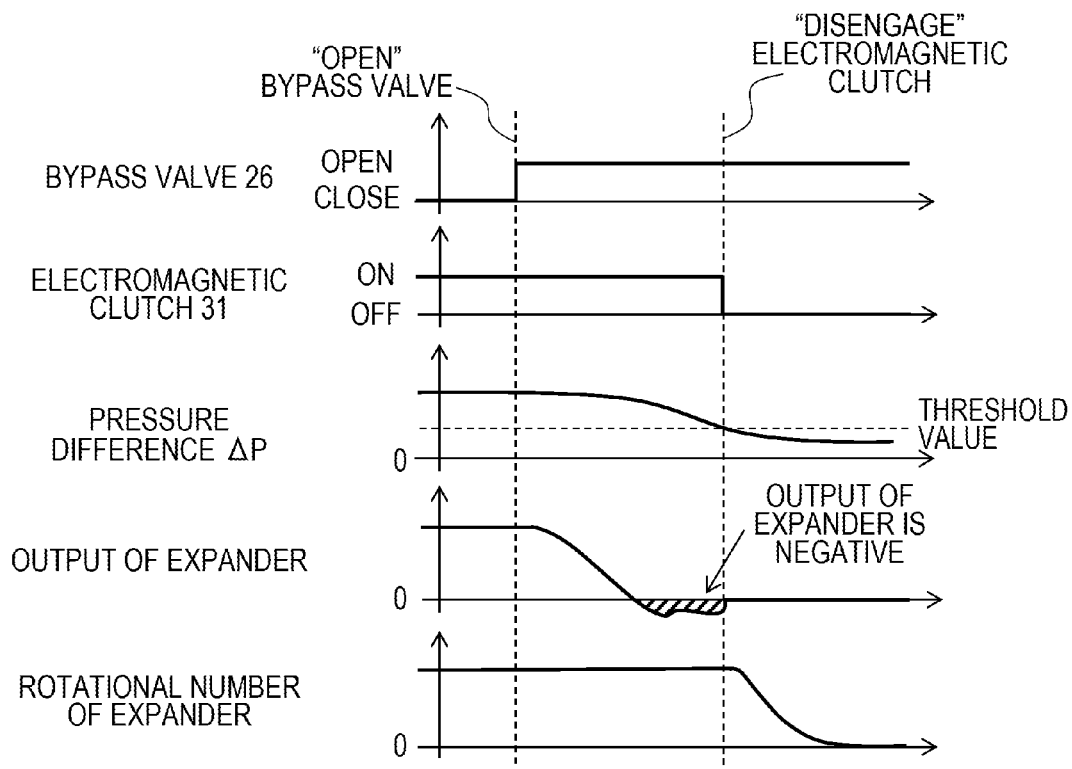
FIG. 5 is a diagram illustrating effects of the Rankine stop control according to the first embodiment.
Figure 6:
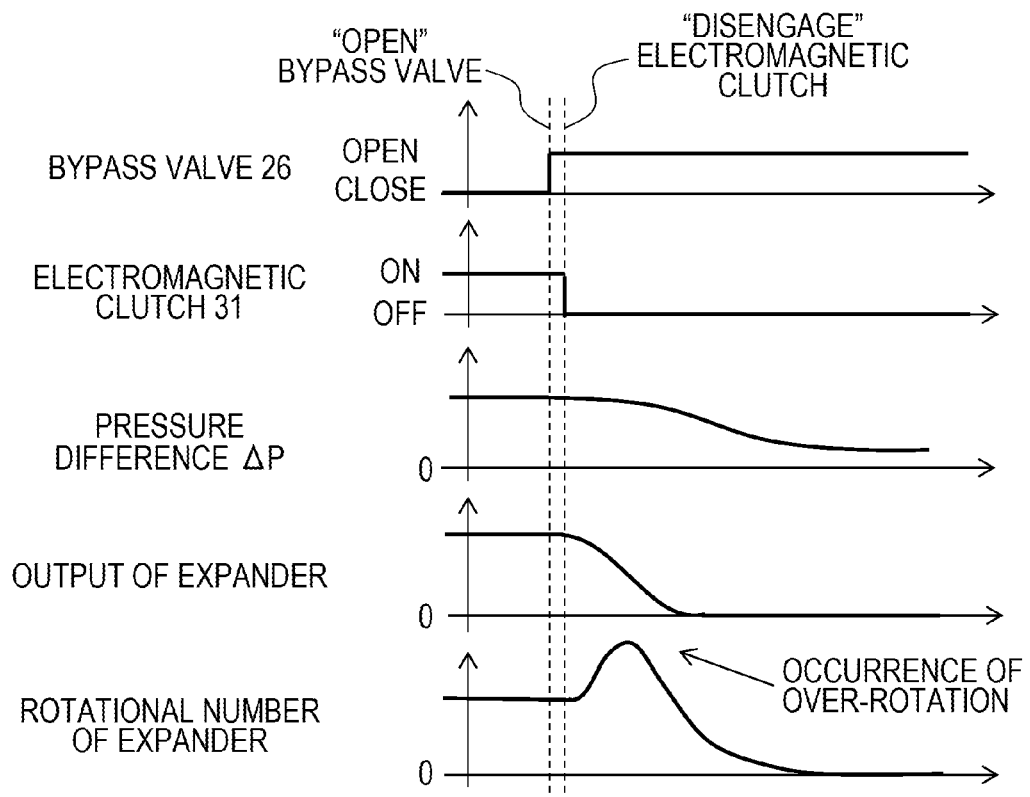
FIG. 6 is a diagram illustrating effects of the Rankine stop control according to the first embodiment.

FIGS. 4 to 6 are diagrams illustrating effects of the Rankine stop control.

FIG. 4 illustrates a timing chart of the Rankine stop control, and FIGS. 5 and 6 illustrate Comparative Examples 1 and 2. Here, in Comparative Example 1 (FIG. 5), at the time of stopping the Rankine cycle 2, the bypass valve 27 is opened at first and then the electromagnetic clutch 31 is disengaged when the pressure difference $\Delta P$ has decreased to a predetermined threshold value. Furthermore, in Comparative Example 2 (FIG. 6), at the time of stopping the Rankine cycle 2, the opening of the bypass valve 27 and the disengagement of the electromagnetic clutch 31 are almost simultaneously performed.

When the bypass valve 27 is opened, since the large amount of refrigerant circulates through the bypass flow passage 26 and thus the amount of refrigerant circulating through the expander 23 significantly reduces, the output of the expander 23 decreases even when the pressure difference $\Delta P$ is present. Accordingly, there is a case in which the output of the expander 23 decreases before the pressure difference $\Delta P$ decreases.

In Comparative Example 1, the expander 23 does not generate the power before the pressure difference $\Delta P$ decreases to the predetermined threshold value, that is, before the electromagnetic clutch 31 is disengaged, and as illustrated by hatching in FIG. 5, the expander 23 becomes a load of the engine 50 (the output of the expander 23 is negative) until the electromagnetic clutch 31 is disengaged after the expander 23 does not generate the power. That is, in Comparative Example 1, timing for disengaging the electromagnetic clutch 31 is too slow. For this reason, fuel efficiency of the engine 50 may decrease or drivability of the vehicle may be likely to be deteriorated.

Meanwhile, in Comparative Example 2, as illustrated in FIG. 6, the electromagnetic clutch 31 is disengaged in a state in which the output of the expander 23 is high, so that the expander 23 becoming a no-load condition, and thus the over-rotation of the expander 23 occurs after the electromagnetic clutch 31 is disengaged. That is, in Comparative Example 2, the timing for disengaging the electromagnetic clutch 31 is too fast. For this reason, by the occurrence of the over-rotation of the expander 23, there is a concern that reliability of the expander 23 is adversely affected or vibration or noise occurs.

In contrast, in the Rankine stop control according to this embodiment, after the bypass valve 27 is opened based on the pressure difference $\Delta P$ immediately before the bypass valve 27 is opened, the time until the output of the expander 23 is sufficiently small (approximately zero) is calculated (predicted) as the waiting time Ta, and the electromagnetic clutch 31 is disengaged when the waiting time Ta has elapsed after the bypass valve 27 is opened. For this reason, there are no cases in which the timing for disengaging the electromagnetic clutch 31 is too slow as in Comparative Example 1 and the timing for disengaging the electromagnetic clutch 31 is too fast as in Comparative Example 2, and thus it is possible to disengage the electromagnetic clutch 31 at the timing when the output of the expander 23 becomes approximately zero as illustrated in FIG. 4.

According to the embodiment described above, at the time of stopping the Rankine cycle 2, the control unit 4 controls to open the bypass valve 27 at first and then disengage the electromagnetic clutch 31 when the waiting time Ta depending on the pressure difference $\Delta P$ immediately before the bypass valve 27 is opened has elapsed. Thus, it is possible to rapidly reduce the output of the expander 23 and to disengage the electromagnetic clutch 31 at the timing when the output of the expander 23 becomes approximately zero, to thereby block the transmission of the power between the engine 50 and the Rankine cycle 2 (expander 23). As a result, during the stop of the Rankine cycle 2, it is possible to effectively prevent the occurrence of the over-rotation of the expander 23 and the load of the expander 23 on the engine 50.

In the above embodiment, the control unit 4 sets (calculates) the waiting time Ta based on the pressure difference $\Delta P$ immediately before the bypass valve 27 is opened.

Instead of this, however, the control unit 4 may set the waiting time Ta based on the pressure difference ΔP at the point of time when the bypass valve 27 is opened. In this case, for example, it can be configured to output an opening command to the bypass valve 27 and to obtain the pressure difference ΔP. That is, the waiting time Ta can be set based on the pressure difference ΔP before the bypass valve 27 is opened or at the point of time when the bypass valve 27 is opened.

In addition, since the waiting time Ta is a prediction value, deviation may occur between the waiting time Ta and an actual time when the output of the expander 23 becomes approximately zero after the bypass valve 27 is opened. Therefore, the control unit 4 may be configured to correct the waiting time Ta, to thereby modify the deviation between the waiting time Ta and the actual time.

For example, the control unit 4 may monitor the rotational number Nex of the expander 23, and determine that the over-rotation of the expander 23 occurs when the rotational number Nex of the expander 23 exceeds a predetermined rotational number (for example, 2000 rpm) immediately after the electromagnetic clutch 31 is disengaged. Then, when the over-rotation of the expander 23 occurs, preferably, when the over-rotation of the expander 23 occurs for a predetermined number of times (for example, ten times) or more, the control unit 4 controls to correct the waiting time Ta by extending the waiting time Ta, which is calculated at step S2, in the next and subsequent Rankine stop control. Furthermore, in this case, for example, the upper limit value may be set for the waiting time Ta such that correction is not performed more than necessary.

In addition, at the time of stopping the engine 50, it is necessary to disengage the electromagnetic clutch 31 as quickly as possible so as to prevent a torque shock of the engine 50 or unintentional forward movement of the vehicle. Therefore, when the engine 50 suddenly stops due to a stop operation of the engine 50 by a driver of the vehicle, it may not have enough time for the above Rankine stop control.

Thus, the control unit 4 controls to open the bypass valve 27 immediately when the stop operation of the engine 50 is executed and then to disengage the electromagnetic clutch 31 when a second waiting time Ta2 shorter than the waiting time Ta has elapsed. Here, the second waiting time Ta2 is a time required for the output of the expander 23 to decrease to a degree at which the torque shock or the unintentional forward movement of the vehicle does not occur after the bypass valve 27 is opened and can be calculated (predicted) based on the pressure difference ΔP as in the waiting time Ta. Thus, it is possible to prevent the torque shock or the unintentional forward movement of the vehicle while reducing the occurrence of the over-rotation of the expander 23 as much as possible. However, the present invention is not limited thereto, the control unit 4 may correct the waiting time Ta calculated at step S2 described above by shortening the waiting time Ta when the stop operation of the engine 10 is executed.

A second embodiment of the present invention will be described below.

Figure 7:
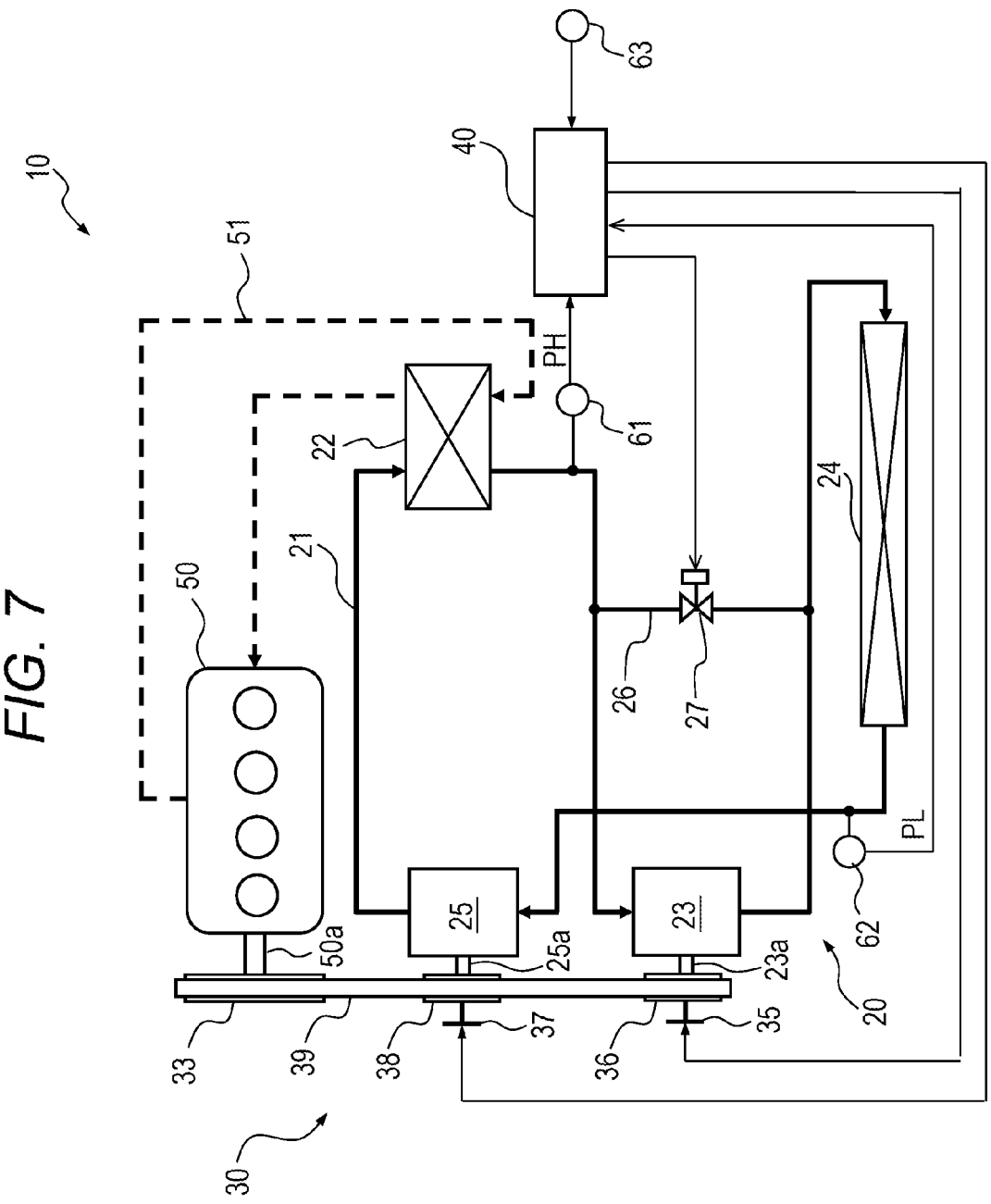
FIG. 7 is a diagram illustrating a schematic configuration of an exhaust heat recovery device according to a second embodiment of the present invention.

FIG. 7 illustrates a schematic configuration of an exhaust heat recovery device 10 according to the second embodiment of the present invention.

In the exhaust heat recovery device 1 according to the first embodiment, the expander 23 and the pump 25 constituting the Rankine cycle are integrally connected by the common rotating shaft 28 a and configured as the "pump-integrated expander 28". In contrast, an expander 23 and a pump 25 constituting a Rankine cycle are separately provided in the exhaust heat recovery device 10 according to the second embodiment. The same components as those in FIG. 1 are denoted by the same reference numerals, and the functions thereof are the same.

As illustrated in FIG. 7, the exhaust heat recovery device 10 includes: a Rankine cycle 20 in which the expander 23 and the pump 25 are separately formed; a power transmission mechanism 30; and a control unit 40. A basic configuration of the Rankine cycle 20 is similar to the Rankine cycle 2 in the first embodiment, and thus the description thereof will not be presented.

The power transmission mechanism 30 has a crank pulley 33 attached to a crankshaft 50a of an engine 50, an expander pulley 36 attached to an output shaft 23a of the expander 23 through a first electromagnetic clutch (expander clutch) 35, a pump pulley 38 attached to a drive shaft 25a of a pump 25 through a second electromagnetic clutch (pump clutch) 37, and a belt 39 that is wrapped around the crank pulley 33, the expander pulley 36, and the pump pulley 38. The control unit 40 executes start-up control (Rankine start-up control) and stop control (Rankine stop control) of the Rankine cycle 20 as in the first embodiment.

Rankine Start-up Control

At the time of starting up the Rankine cycle 20, the control unit 40 controls to open the bypass valve 27 and actuate the pump 25 by turning on (engaging) the second electromagnetic clutch 37 at first, and then, when a pressure difference ΔP between a high-pressure side pressure PH and a low-pressure side pressure PL of the Rankine cycle 20 is equal to or greater than a first predetermined value ΔPs1, the control unit 40 controls to turn on (engage) the first electromagnetic clutch 35 and then close the bypass valve 27. When the pump 25 is an electric pump, the control unit 40 outputs driving signals to the pump 25 instead of turning on the second electromagnetic clutch 37.

Rankine Stop Control

Figure 8:
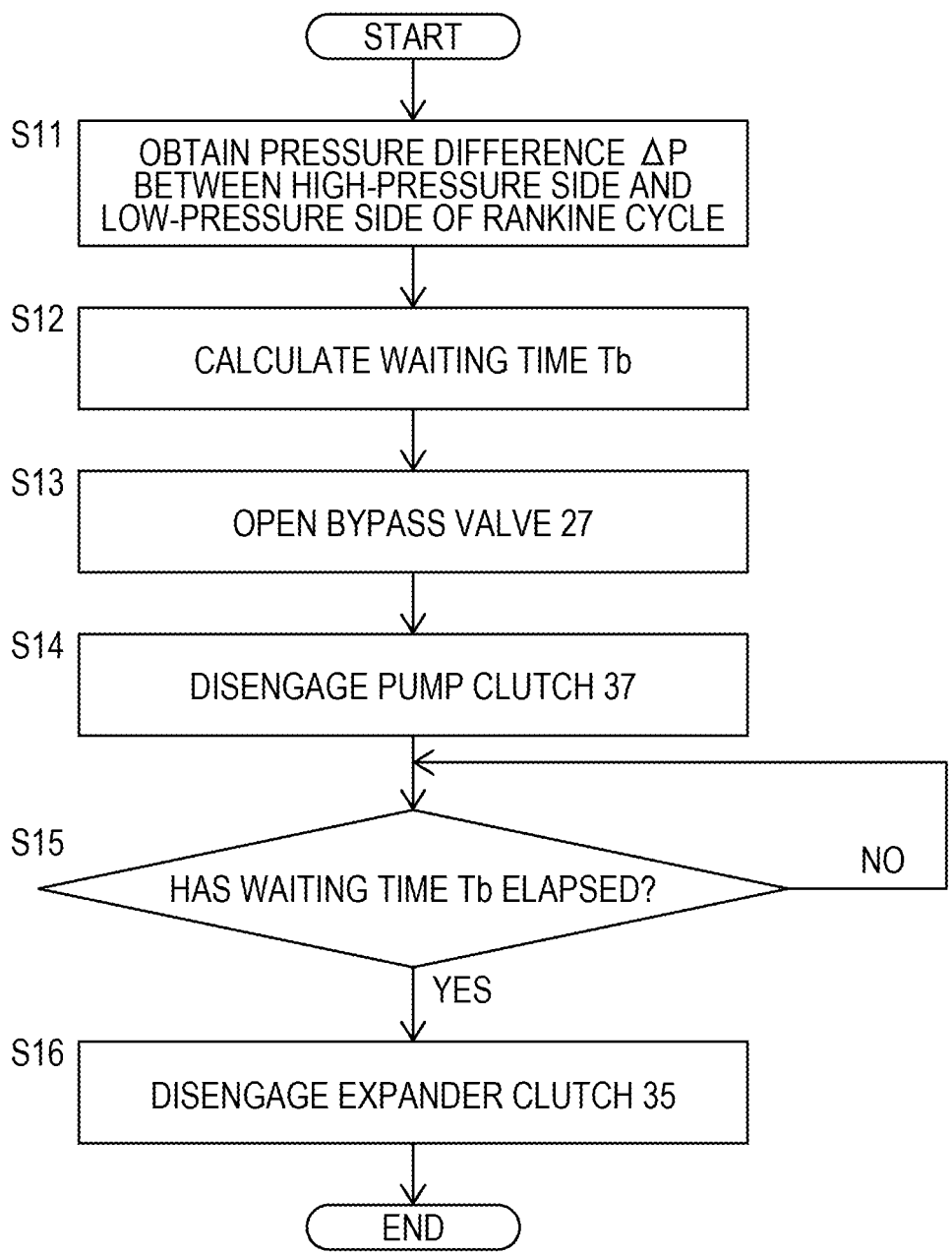
FIG. 8 is a flowchart of Rankine stop control according to the second embodiment.

FIG. 8 is a flowchart of Rankine stop control to be executed by the control unit 40. In FIG. 8, similarly to steps S1 and S2 in FIG. 2, the pressure difference ΔP between the high-pressure side pressure PH and the low-pressure side pressure PL of the Rankine cycle 20 is obtained and a waiting time Tb is calculated based on the obtained pressure difference ΔP at steps S11 and S12.

Similarly to step S3 in FIG. 2, the bypass valve 27 is opened at step S13.

At step S14, the second electromagnetic clutch (pump clutch) 37 is disengaged to block the transmission of power between the engine 50 and the pump 25. Thus, the pump 25 is stopped. In the case of the electric pump, a stop signal is output and thus the electric pump is stopped.

By these steps S13 and S14, refrigerant does not circulate through the expander 23 and the output of the expander 23 starts to decrease. The pump clutch 37 is disengaged after the bypass valve 27 is opened in this embodiment, but the bypass valve 27 may be opened after the pump clutch 37 is disengaged and the opening of the bypass valve 27 and the disengagement of the pump clutch 37 may be performed at the same time.

At step S15, it is determined whether the waiting time Tb has elapsed after the bypass valve 27 is opened. When the waiting time Tb has elapsed, the process proceeds to step S16.

At step S16, the first electromagnetic clutch (expander clutch) 35 is disengaged to block the transmission of the power between the engine 50 and the expander 23. Thus, the expander 23 is stopped, and the Rankine cycle 20 is stopped.

Even in the exhaust heat recovery device 10 according to the second embodiment, it is possible to obtain the same effects as those of the exhaust heat recovery device 1 according to the first embodiment. That is, at the time of stopping the Rankine cycle 20, it is possible to rapidly reduce the output of the expander 23 and to disengage the expander clutch 35 at the timing when the output of the expander 23 becomes approximately zero, to thereby block the transmission of the power between the engine 50 and the Rankine cycle 20 (expander 23). As a result, it is possible to effectively prevent the occurrence of the over-rotation of the expander 23 and the load of the expander 23 on the engine 50.

Even in the exhaust heat recovery device 10 according to the second embodiment, the control unit 40 may set the waiting time Tb based on the pressure difference $\Delta P$ at the point of time when the bypass valve 27 is opened. In addition, when the over-rotation of the expander 23 occurs, the control unit 40 may control to correct the waiting time Tb by extending the waiting time Tb in the next and subsequent Rankine stop control. Furthermore, when the stop operation of the engine 50 is executed, the bypass valve 27 may be opened immediately, and then the expander clutch 35 may be disengaged when a second waiting time Tb2, which is shorter than the waiting time Tb, has elapsed.

The preferred embodiments of the present invention have been described above, but it should be apparent that the present invention is not intended to be limited thereto, and modifications and variations can be made based on the technical concept of the present invention.

For example, in the embodiments described above, at the time of stopping the Rankine cycles 2 and 20, the waiting times Ta and Tb are set depending on the pressure difference $\Delta P$ between the high-pressure side pressure PH and the low-pressure side pressure PL of the Rankine cycles 2 and 20 before the bypass valve 27 is opened or at the point of time when the bypass valve 27 is opened, but is not limited thereto. In addition to the pressure difference $\Delta P$, the waiting times Ta and Tb may be set based on several values indicating operation states or operation conditions of the Rankine cycles 2 and 20 before the bypass valve 27 is opened or at the point of time when the bypass valve 27 is opened, since it has been confirmed that the several values indicating operation states or operation conditions of the Rankine cycles 2 and 20 are correlated with the time until the output of the expander 23 becomes sufficiently smaller (becomes approximately zero) after the bypass valve 27 is opened.

FIGS. 9A to 9D illustrate examples of waiting time setting tables, which may be used in place of the "waiting time setting table (FIG. 3)" described above.

Figure 9A:
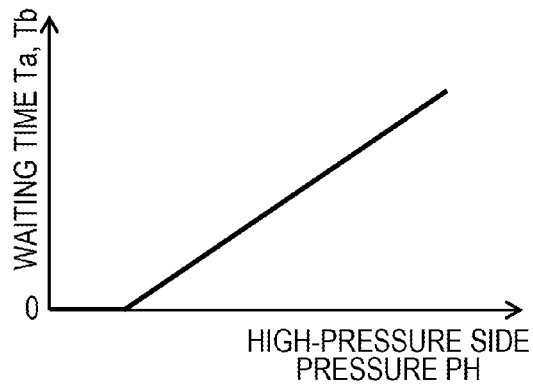
FIGS. 9A to 9D are diagram illustrating other examples of waiting time setting tables.

FIG. 9A illustrates an example of the waiting time setting table used for setting the waiting times Ta and Tb based on the high-pressure side pressure PH of the Rankine cycles 2 and 20. As illustrated in FIG. 9A, basically, the waiting times Ta and Tb become longer as the high-pressure side pressure PH becomes higher. As in the case of the pressure difference $\Delta P$, since a linear relation is established between the high-pressure side pressure PH and the waiting times Ta and Tb, the waiting times Ta and Tb can be calculated by multiplying the high-pressure side pressure PH by a predetermined coefficient.

Figure 9B:
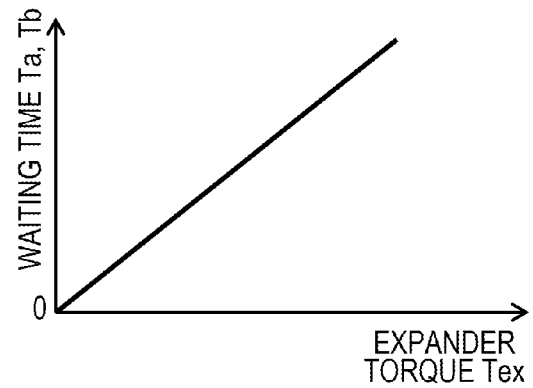

FIG. 9B illustrates an example of the waiting time setting table used for setting the waiting times Ta and Tb based on a torque Tex of the expander 23. As illustrated in FIG. 9B, the waiting times Ta and Tb become longer as the expander torque Tex becomes greater. Naturally, the waiting times Ta and Tb may be calculated by multiplying the expander torque Tex by a predetermined coefficient. Here, the expander torque Tex can be calculated (estimated) by (1) a first estimation formula (Tex=f(PH, Nex)) obtained using the high-pressure side pressure PH and the rotational number Nex of the expander 23 as parameters or (2) a second estimation formula (Tex=f($\Delta P$, Nex)) obtained using the pressure difference $\Delta P$ between the high-pressure side pressure PH and the low-pressure side pressure PL and the rotational number Nex of the expander as parameters. In a case of measuring a refrigerant temperature Tr on the inlet side of the expander 23, the expander torque Tex can be calculated (estimated) by (3) a third estimation formula (Tex=f(PH, Nex, Tr)) obtained using the high-pressure side pressure PH, the rotational number Nex of the expander, and the refrigerant temperature Tr on the inlet side of the expander as parameters or (4) a fourth estimation formula (Tex=f($\Delta P$, Nex, Tr)) obtained using the pressure difference $\Delta P$, the rotational number Nex of the expander, and the refrigerant temperature Tr on the inlet side of the expander as parameters.

Figure 9C:
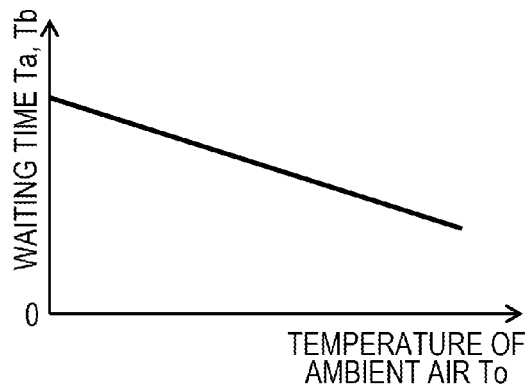

FIG. 9C illustrates an example of the waiting time setting table used for setting the waiting times Ta and Tb based on a temperature To of ambient air. As illustrated in FIG. 9C, the waiting times Ta and Tb become shorter as the temperature To of ambient air becomes higher. Naturally, the waiting times Ta and Tb may be calculated by multiplying the temperature To of ambient air by a predetermined coefficient.

Figure 9D:
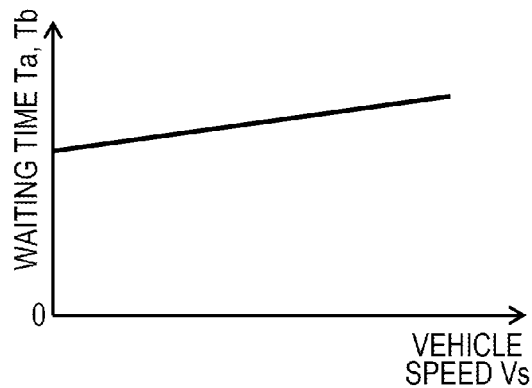

FIG. 9D illustrates an example of the waiting time setting table used for setting the waiting times Ta and Tb based on a vehicle speed Vs. As illustrated in FIG. 9D, the waiting times Ta and Tb become longer as the vehicle speed Vs becomes higher. Naturally, the waiting times Ta and Tb may be calculated by multiplying the vehicle speed Vs by a predetermined coefficient. In this case, the control unit 4 is configured to obtain the vehicle speed Vs from the controller of the vehicle.

Similarly to the "waiting time setting table" illustrated in FIG. 3, the maximum waiting time Tmax may also be set in the "waiting time setting tables" illustrated in FIGS. 9A to 9D.

Furthermore, the exhaust heat recovery device according to the above-described embodiments is mounted on the vehicle, and recovers and uses exhaust heat of an engine of the vehicle, but the present invention is also applicable to an exhaust heat recovery device that recovers and uses exhaust heat from an external heat source other than the vehicle engine.

REFERENCE SYMBOL LIST 1, 10 Exhaust heat recovery device
2, 20 Rankine cycle
3, 30 Power transmission mechanism
31 Electromagnetic clutch
4, 40 Control unit
50 Engine
21 Refrigerant circulating passage
22 Heater
23 Expander
24 Condenser
25 Pump
26 Bypass flow passage
27 Bypass valve
28 Pump-integrated expander
35 Expander clutch 37 Pump clutch
61, 62 Pressure sensor
63 Rotation sensor

The invention claimed is:

1. An exhaust heat recovery device comprising:
   a Rankine cycle that is provided with: a heater configured to heat and vaporize refrigerant by exhaust heat of an engine; an expander configured to expand the refrigerant passed through the heater to generate power; a condenser configured to condense the refrigerant passed through the expander; and a pump configured to send the refrigerant passed through the condenser to the heater, the heater, the expander, the condenser, and the pump being arranged in a refrigerant circulating passage;
   a bypass flow passage that allows the refrigerant to circulate while bypassing the expander;
   a bypass valve that opens and closes the bypass flow passage;
   a power transmission mechanism that has a clutch mechanism and is capable of transmitting power between the expander and the engine when the clutch mechanism is engaged; and
   a control unit that, at the time of stopping the Rankine cycle, executes control to open the bypass valve and then to disengage the clutch mechanism when a waiting time has elapsed, the waiting time being set depending on operation states or operation conditions of the Rankine cycle before the bypass valve is opened or at the point of time when the bypass valve is opened.

2. The exhaust heat recovery device according to claim 1, wherein the waiting time is calculated by multiplying a value indicating the operation states or the operation conditions by a predetermined coefficient.

3. The exhaust heat recovery device according to claim 2, further comprising a pressure difference obtaining unit that obtains a pressure difference between a high-pressure side and a low-pressure side of the Rankine cycle,
   wherein the pressure difference between the high-pressure side and the low-pressure side of the Rankine cycle is used as the value indicating the operation states or the operation conditions.

4. The exhaust heat recovery device according to claim 2, further comprising a pressure measuring unit that measures a pressure of a high-pressure side of the Rankine cycle,
   wherein the pressure of the high-pressure side of the Rankine cycle is used as the value indicating the operation states or the operation conditions.

5. The exhaust heat recovery device according to claim 2, wherein the exhaust heat recovery device is mounted on a vehicle, and a vehicle speed is used as the value indicating the operation states or the operation conditions.

6. The exhaust heat recovery device according to claim 1, wherein the control unit sets the waiting time based on a temperature of ambient air.

7. The exhaust heat recovery device according to claim 1, further comprising a rotational number measuring unit that measures a rotational number of the expander,
   wherein in a case in which an over-rotation of the expander, in which the rotational number of the expander exceeds a predetermined rotational number, occurs after the clutch mechanism is disengaged, the control unit corrects the waiting time by extending the waiting time in the next stop of the Rankine cycle.

8. The exhaust heat recovery device according to claim 1, wherein when a stop operation of the engine is executed during the operation of the Rankine cycle, the control unit executes control to open the bypass valve immediately, and then controls to disengage the clutch mechanism when a second waiting time has elapsed, the second waiting time being shorter than the waiting time.

9. The exhaust heat recovery device according to claim 1, wherein the expander and the pump in the Rankine cycle are integrally connected to each other.

* * * * *